United States Patent
Falk-Petersen (10) Patent No.: US 11,767,110 B2
(45) Date of Patent: Sep. 26, 2023

(54) SYSTEM FOR STORING, AUTONOMOUSLY LAUNCHING AND LANDING UNMANNED AERIAL VEHICLES

(71) Applicant: FLIR Unmanned Aerial Systems AS, Hvalstad (NO)

(72) Inventor: Erik Falk-Petersen, Hvalstad (NO)

(73) Assignee: FLIR Unmanned Aerial Systems AS, Hvalstad (NO)

(*) Notice: Subject to any disclaimer, the term of this patent is extended or adjusted under 35 U.S.C. 154(b) by 184 days.

(21) Appl. No.: 17/121,718

(22) Filed: Dec. 14, 2020

(65) Prior Publication Data

US 2021/0179290 A1 Jun. 17, 2021

Related U.S. Application Data

(60) Provisional application No. 62/948,764, filed on Dec. 16, 2019.

(51) Int. Cl.
*B64C 39/02* (2023.01)
*B64C 1/30* (2006.01)
(Continued)

(52) U.S. Cl.
CPC .............. *B64C 39/024* (2013.01); *B64C 1/30* (2013.01); *B64U 70/00* (2023.01); *B64U 80/70* (2023.01); *B64U 80/86* (2023.01)

(58) Field of Classification Search
CPC ...... B64F 1/04; B64F 1/007; B64C 2201/201; B64C 2201/08; B64C 2201/18; B64U 70/00; B64U 70/70; B64U 70/90
See application file for complete search history.

(56) References Cited

U.S. PATENT DOCUMENTS 8,418,959 B2 4/2013 Kang et al.
9,429,953 B1 8/2016 Miller et al.
(Continued)

FOREIGN PATENT DOCUMENTS

CN 103700286 4/2014
CN 104215239 12/2014
(Continued)

OTHER PUBLICATIONS

Fotokite Phi A Drone On A Leash, Best Quadcopter, Feb. 14, 2018, retrieved from Internet, URL: https://www.best-quadcopter.com/news/2018/02/fotokite-phi-a-drone-on-a-leash/, 3 pages.
(Continued)

*Primary Examiner* — Joshua J Michener
*Assistant Examiner* — Arfan Y. Sinaki
(74) *Attorney, Agent, or Firm* — Haynes and Boone, LLP (57) ABSTRACT

In various embodiments, specialized vehicle launch systems and methods are provided to enable personnel to launch and operate one or more UAVs from the safety of a vehicle or other mobile location. In various embodiments, a launch system comprises a launch device and an operator terminal. The launch device is adapted to be mounted on an exterior surface of a vehicle and is communicably coupled to the operator terminal, which is operable from the interior of the vehicle. The vehicle launch system allows an operator to control one or more UAVs from inside the vehicle, without requiring the operator to step outside of the vehicle to interact with the UAV or launch device. The UAVs include foldable articulating arms facilitating storage in cylindrical launch/land unit housings. Each UAV is stored on a landing platform comprising an extended landing platform that include articulating arms and foldable surface.

19 Claims, 9 Drawing Sheets

(51) Int. Cl.
  *B64U 70/00* (2023.01)
  *B64U 80/70* (2023.01)
  *B64U 80/86* (2023.01)

(56) References Cited

U.S. PATENT DOCUMENTS

| | | | |
|---|---|---|---|
| 9,499,265 B2 | 11/2016 | Sanz et al. | |
| 9,764,836 B1* | 9/2017 | Elzinga | B64C 39/024 |
| 9,845,165 B2 | 12/2017 | Michalski et al. | |
| 10,124,912 B2 | 11/2018 | Walsh et al. | |
| 10,156,854 B2 | 12/2018 | Yang et al. | |
| 2009/0314883 A1* | 12/2009 | Ariton | F41A 9/13 244/63 |
| 2014/0236390 A1* | 8/2014 | Mohamadi | B64D 47/08 701/16 |
| 2015/0051758 A1 | 2/2015 | Cho | |
| 2018/0029723 A1 | 2/2018 | Krauss et al. | |
| 2018/0170191 A1* | 6/2018 | Xing | H02J 7/0044 |
| 2019/0023416 A1* | 1/2019 | Borko | B65G 1/0485 |
| 2019/0077519 A1* | 3/2019 | Husain | B64C 39/024 |
| 2019/0100330 A1* | 4/2019 | Cheng | B64F 1/22 |
| 2019/0308724 A1* | 10/2019 | Cooper | B64F 1/222 |
| 2020/0094957 A1* | 3/2020 | Sohmshetty | B64C 39/024 |
| 2020/0277040 A1* | 9/2020 | Liu | B64C 11/28 |
| 2021/0031944 A1* | 2/2021 | Kuffner, Jr. | B64F 1/007 |
| 2021/0070468 A1* | 3/2021 | Svirsky | B64F 1/007 |

FOREIGN PATENT DOCUMENTS

| | | |
|---|---|---|
| CN | 104656669 | 5/2015 |
| CN | 105182995 | 12/2015 |
| CN | 105197252 | 12/2015 |
| WO | WO 2016137982 | 9/2016 |

OTHER PUBLICATIONS

Sunflower Labs, Technical Specifications, "The Bee", "The Sunflowers", and "The Hive", Oct. 15, 2019, retrieved from Internet, URL: https://www.sunflower-labs.com/specs, 4 pages.

Techcrunch, "Airobotics makes autonomous drones in a box", Jul. 16, 2018, retrieved from Internet, URL: https://www.youtube.com/watch?app=desktop&v=TVuj3qwyc7s, time stamp: 0.41, 2 pages.

Airobotics UAV, "Airobotics Teaser", Jun. 21, 2016, retrieved from Internet, URL: https://www.youtube.com/watch?app=desktop&v=wwLWiTUqvWE, time stamp: 0:34 to 0:42, 3 pages.

\* cited by examiner

SYSTEM FOR STORING, AUTONOMOUSLY LAUNCHING AND LANDING UNMANNED AERIAL VEHICLES

CROSS-REFERENCE TO RELATED APPLICATIONS

This application claims the benefit of and priority to U.S. Provisional Patent Application No. 62/948,764 filed Dec. 16, 2019 and entitled "SYSTEMS FOR STORING, AUTONOMOUSLY LAUNCHING AND LANDING UNMANNED AERIAL VEHICLES," which is incorporated herein by reference in its entirety.

TECHNICAL FIELD

One or more embodiments of the present disclosure relate generally to unmanned aerial vehicles (UAVs) and more particularly, for example, to devices, systems and methods for storing, remotely launching, and controlling one or more UAVs.

BACKGROUND

In many military and civilian operations, it is often desirable to have personnel remain in positions where they are protected, such as the inside of a vehicle. The confinement of a vehicle, however, offers few possibilities to investigate areas of interest and limited situational awareness and overview. In many scenarios, it may be critical to increase situational awareness when confined to a vehicle, such as by use of a UAV. However, it may be difficult to launch a UAV without putting personnel at risk. In view of the foregoing, there is a continued need for improved systems and methods for launching, storing and controlling UAVs from mobile locations, such a vehicle.

SUMMARY

The present disclosure is directed to systems and methods for storing, launching and landing unmanned aerial vehicles (UAVs). Systems and methods disclosed herein include improved UAV and launch/land pad designs allowing for protected storage and remote launching and landing of UAVs in mobile scenarios.

In various embodiments, specialized launch systems and methods are provided to enable an operator to launch and operate one or more unmanned aerial vehicles (UAVs) from a safe location. A launch system comprises a launch device and an operator terminal. The launch device is configured to be mounted on an exterior surface of a mobile structure and is communicably coupled to the operator terminal, which may be operable from the interior of the mobile structure (e.g., inside an armored vehicle) or other protected location. The mobile launch system allows an operator to control one or more UAVs from inside the vehicle, without requiring the operator to step outside of the vehicle to interact with the UAV or launch device. In various embodiments, the UAV and the launch/land pad include articulating arms that fold for storage in a protective housing. An actuator controls the vertical positioning of the launch/land pad in the protective housing between a storage state and a launching/landing state.

The scope of the invention is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure relate generally to systems and methods for launching, storing and controlling unmanned aerial vehicles (UAVs). In various embodiments, specialized vehicle launch systems and methods are provided to enable personnel to launch and operate one or more UAVs from the safety of a vehicle or other mobile location. In various embodiments, the UAV and launch/land pad are stored inside a protective structure and deployed by an actuator.

Unmanned Aerial Vehicles are increasingly autonomous, and the demand for fully automatic launch and landing capabilities are on the rise. Additionally, the demand for vehicle-based UAV systems further emphasize the need for smaller, more robust fully autonomous solutions that work in a multitude of environments. Vehicle systems may also need to function in motion and/or when the vehicle is inclined. Solutions currently on the market are typically very large and mechanically complex or completely lacking. One challenge is to move the UAV from a dynamic, flying state, affected by variations in wind and navigation conditions to one where it is constrained mechanically and connected electronically in a separate device (stationary or on a vehicle which may in turn be moving). The electrical connections typically require a degree of accuracy that must be met for a remote system to operate effectively in the field. The solutions disclosed herein address several of these problems.

Conventional UAV systems are designed with large, flat landing surfaces to facilitate landing of a UAV and the subsequent mechanical aligning of the UAV to the electrical infrastructure associated with the launch pad. These large landing surfaces consume valuable space on a vehicle or other mobile structure, limiting the number of UAVs that may be launched and the placement of the launching/landing structures on the vehicle.

Figure 1A:
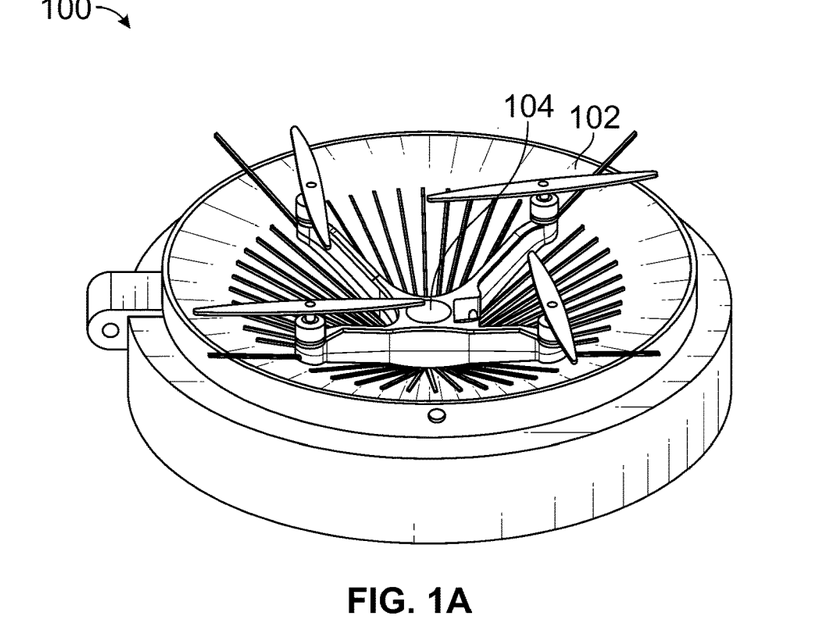
FIGS. 1A-B illustrate example funnel concepts for launching/landing pads for unmanned aerial vehicles (UAVs), in accordance with embodiments of the disclosure.
Figure 1B:
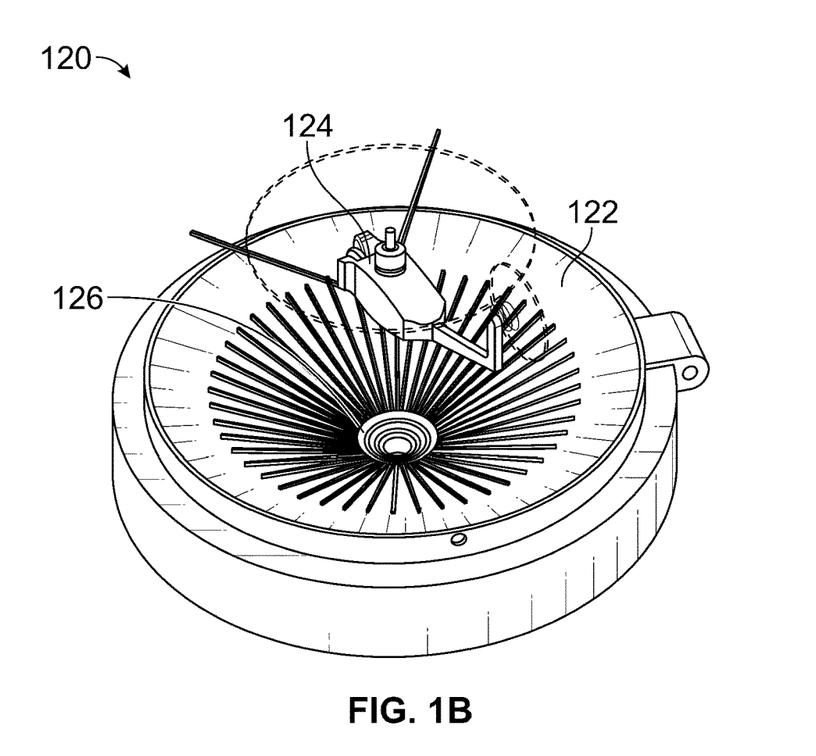

Referring to FIG. 1A and FIG. 1B, example funnel concepts are illustrated that facilitate self-centering and alignment of a UAV with an LLU that includes docking features. In these illustrated approaches, the UAV is shaped to self-center within a single funnel to account for inaccuracies. In FIG. 1A, a system 100 includes a wide landing surface 102 allowing a UAV 104 to safely dock and connect electronics (e.g., at the center of the dock). In FIG. 1B, a system 120 illustrates a landing surface 122, which is the shape of a funnel for guiding a UAV 124 to land. Electrical connections 126 are provided at the bottom of the funnel to connect to the electrical system of the UAV 124 for charging and/or communications.

Figure 2A:
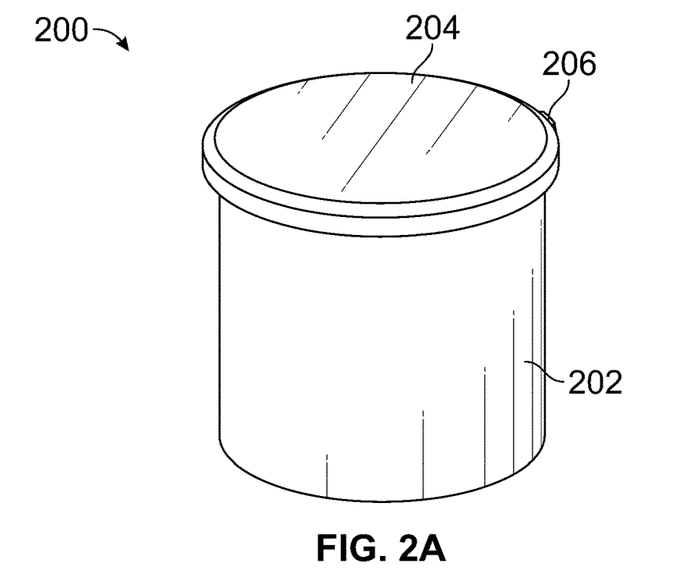
FIGS. 2A-B illustrate an example system for storing, launching and landing a UAV, in accordance with embodiments of the present disclosure.
Figure 2B:
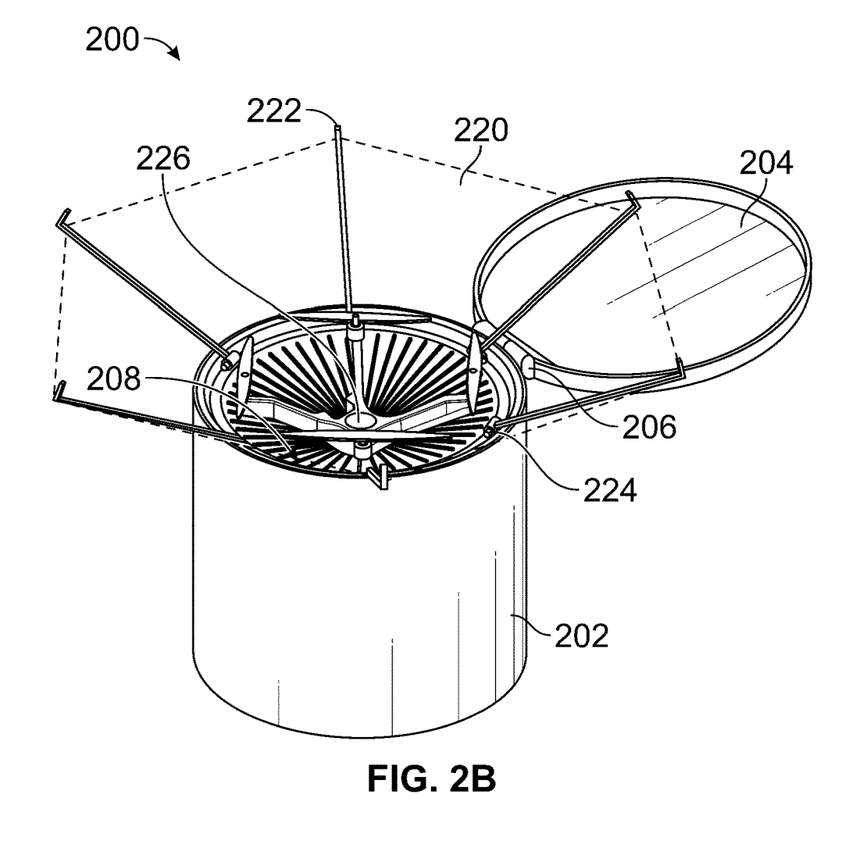

Referring to FIGS. 2A and 2B, an example embodiment of an improved system for storing, launching and landing a UAV will now be described. A system 200 includes a housing 202 for storing and launching a UAV and a cover 204 to protect the UAV and internal components of the housing 202 during storage. In some embodiments, the housing 202 is a cylindrical tube or other shape for storing and launching a UAV as described herein. The cover 204 is connected to the housing 202 at a hinge 206, which allows the cover to swing open and closed during operation. In some embodiments, the hinge 206 includes a spring or other bias to cause the cover to close over an opening of the housing 202 as illustrated in FIG. 2A when not in use.

As illustrated in FIG. 2B, the system 200 includes a launching/landing state providing access to a landing platform 208. In operation, an actuator (not shown) within the housing 202 is configured to selectively raise and lower the landing platform 208 to move between a protective storage state (as illustrated in FIG. 2A) to the launch/landing state illustrated in FIG. 2B. The landing platform 208 includes a funnel shaped landing surface which allows a UAV 226 to position itself on the landing platform 208 to provide a charging and/or communication coupling between the UAV 226 and components of the landing platform 208. The landing platform 208 further includes a plurality of articulating arms 222 that are rotatably attached around a perimeter of the landing platform 208. As illustrated, the landing platform 208 includes hinges that bias the arms 222 outward away from the center of the landing platform 208 when the landing platform 208 in the launching/landing state. A foldable surface 220 is connected between the arms to extend the landing surface in the launching/landing state.

When the actuator is controlled to lower the landing platform, the landing platform 208 is lowered within the housing 202 to move the UAV 226 inside the housing 202 into a protective storage state. As the landing platform 208 is lowered, each of the arms 222 is folded into the housing 202 at its respective hinge 224 by the interior wall of the housing 202. In addition, one or more of the mechanisms including the landing platform 208 and/or the arms 222 engage the cover 204 to open the cover 204 when in the launch and landing state. As the landing platform 208 is lowered, the pressure against the cover 204 is released and the cover 204 closes as the arms 222 are pulled inside the housing 202. Thus, the system 200 includes a landing platform 208 that may be raised and lowered to change states from the protective storage state to the unfolded state for extending the landing platform size. In accordance with one or more embodiments, the LLU is shaped like a funnel to facilitate positioning of the UAV 226 in the center of the landing platform 208 for electrical connection with components of the housing 202 (e.g., power and/or communications). The UAV 226 is similarly shaped so that wherever it lands within the LLU funnel, it will self-center. This compensates for last second variations and inaccuracies. This method can be used with any type of airframe but lends itself particularly well to multirotor devices due to their symmetrical design.

Figure 3A:
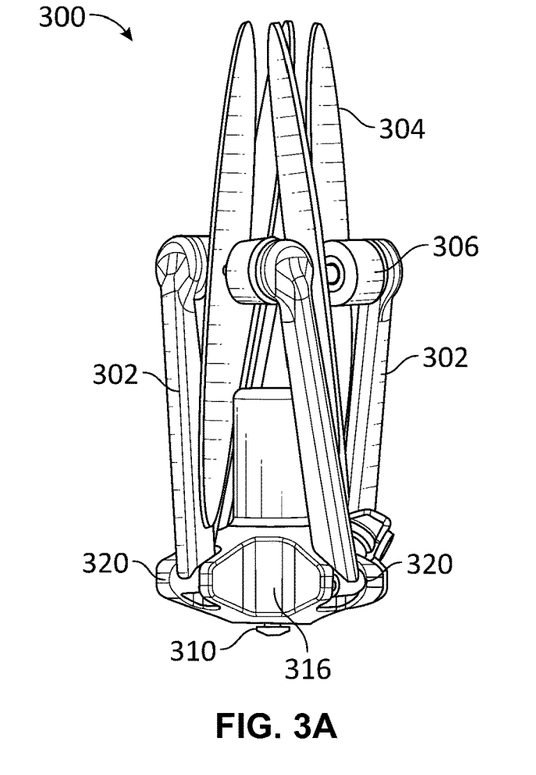
FIGS. 3A-B illustrate a UAV in a storage and launch/land state, in accordance with embodiments of the present disclosure.
Figure 3B:
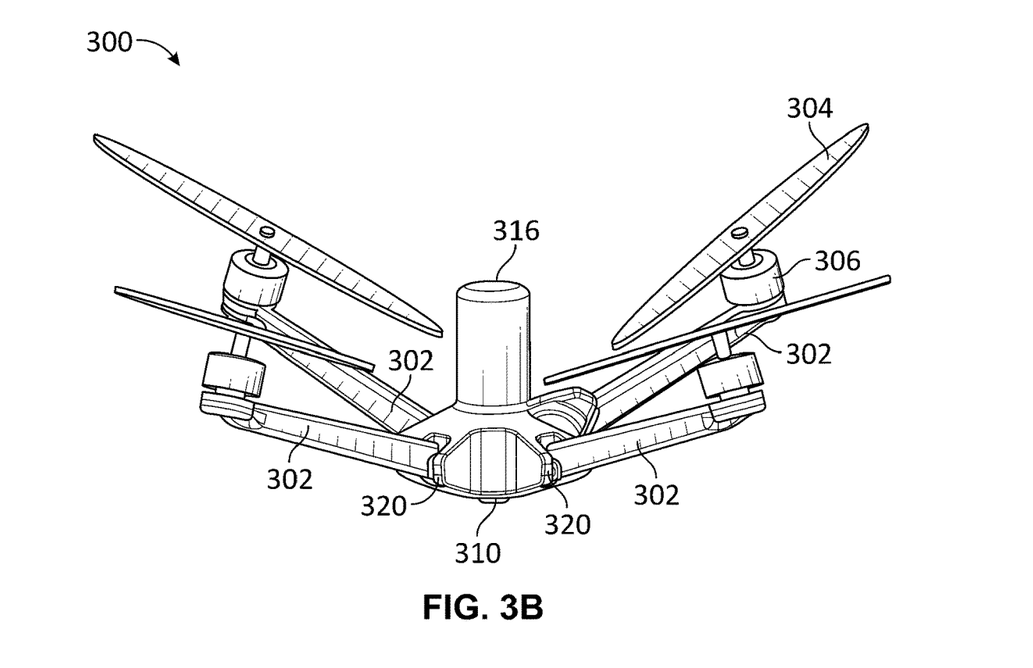

Another example embodiment of a UAV will now be described with reference to FIGS. 3A and 3B, which show a UAV 300 in a storage and launch state, respectively. The UAV 300 is fitted with articulated arms 302, loaded with more force that its own weight can produce in flight. These arms fold upwards by use of an actuator in the LLU, which ensures a compact storage mode for the UAV. As illustrated, the UAV 300 includes a body 316 including hinges 320 for connecting the arms 302. Each arm 302 has a first end connected to the body 316 through a corresponding hinge 320, and a second end adapted to mount a motor 306 and rotor 304. The body 316 may house control electronics, a memory, a gyroscope, a battery for powering the UAV during flight, a payload such as a camera for capturing image during flight, and communications components for receiving remote control instructions and/or communicating data between the drone and a host device.

In some embodiments, the UAV 300 is configured to land in the landing platform (e.g., the landing platform of FIG. 2A-B) and settle into the center of the funnel-shaped platform. The folding of the arms may be controlled through one or more mechanisms depending on the configuration. In one embodiment, the landing platform is configured to engage a member 310 of the UAV 300 and pull the UAV down as the landing platform descends into the housing. The arms 302 are then pushed and inside the housing up by the sides of the housing into the folded position illustrated in FIG. 3A. As the landing platform is raised, the second end of the arms 302 clear the sides of the housing and the bias in the hinge 320 pushes the arms 302 out to the flight position as illustrated in FIG. 3B.

Figure 4A:
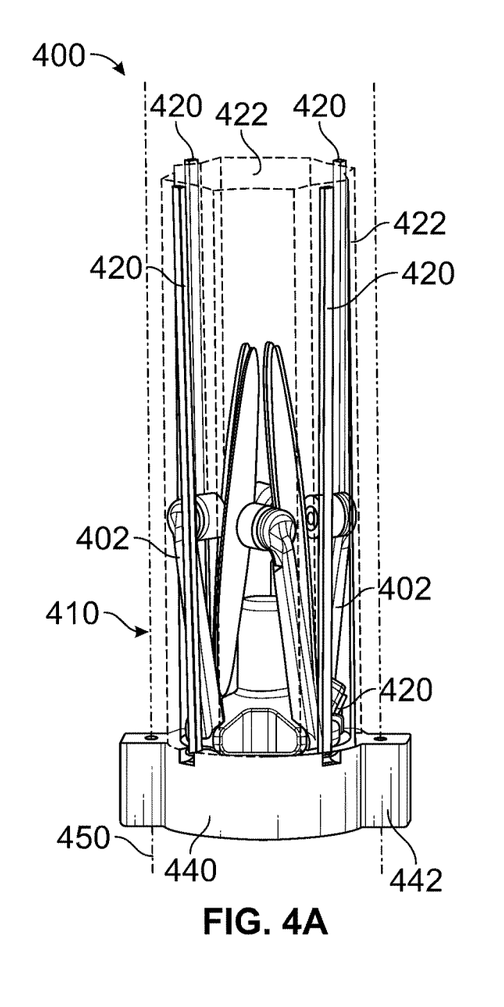
FIGS. 4A-B illustrate an example launching/landing unit in a storage and launch/land state, in accordance with embodiments of the present disclosure.
Figure 4B:
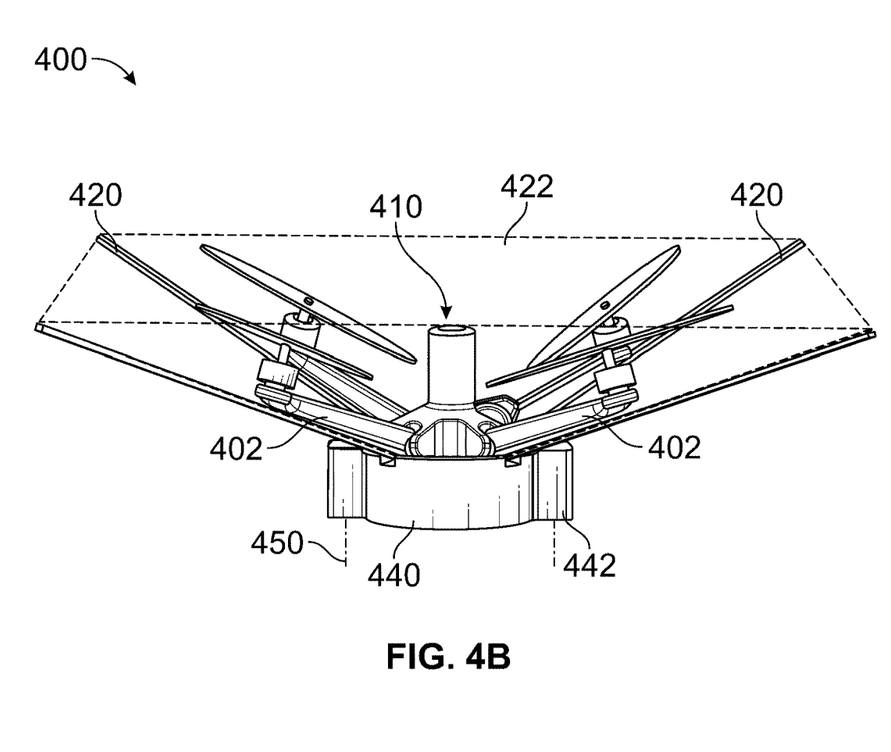

Referring to FIG. 4A and FIG. 4B, a corresponding LLU 400 in a storage state and launch/land state, respectively, will now be described in accordance with one or more embodiments. In one embodiment, the LLU 400 transforms its shape between a launch/land state and a storage state. As illustrated, a connector platform 440 with a flexible fabric 422 between an actuated set of arms 420 (e.g., similar to an upside-down umbrella) provides an extended launch platform. The launch/land-device forms a funnel when in the launch/land state (FIG. 4B). The arms 420 fold upward when in a storage state to reduce its footprint. In one embodiment, the UAV 410 stored on the platform will fold its arms 402 upwards along with the arms of the platform when it changes state. The platform 440 may be driven up and down inside a housing along one or more guides 450, which may include a servo mechanism including a motor and one or more lead screws or rods for driving the platform up and down. In some embodiments, the platform 440 includes one or more side portions 442 that include a threaded portion that engages with the treads of a lead screw causing the platform 440 to move up and down when the lead screw is rotated.

Figure 5A:
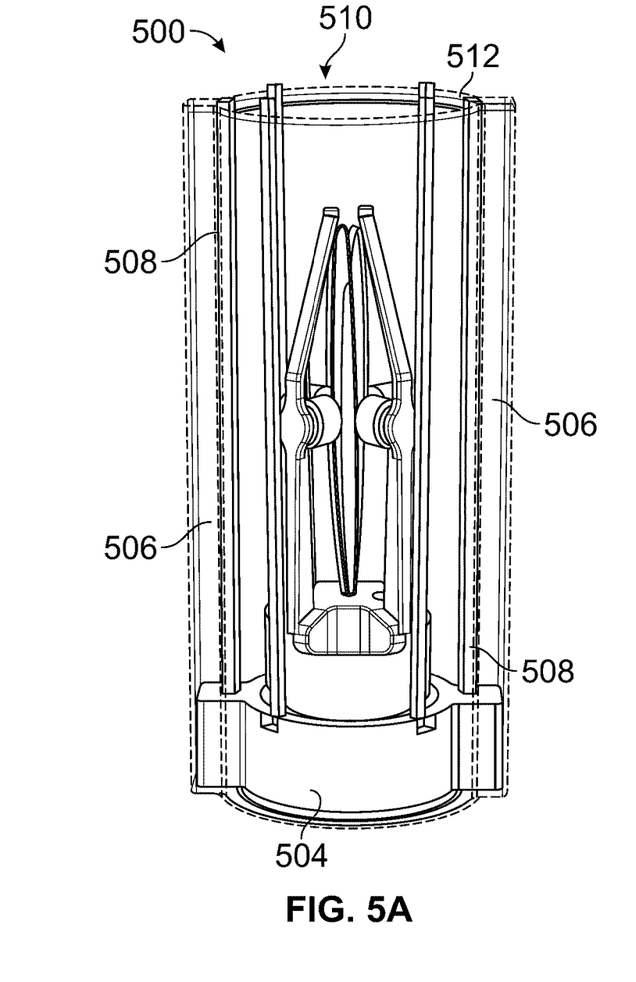
FIGS. 5A-B illustrate an example launching/landing unit and protective housing in a storage and launch/land state, in accordance with embodiments of the present disclosure.
Figure 5B:
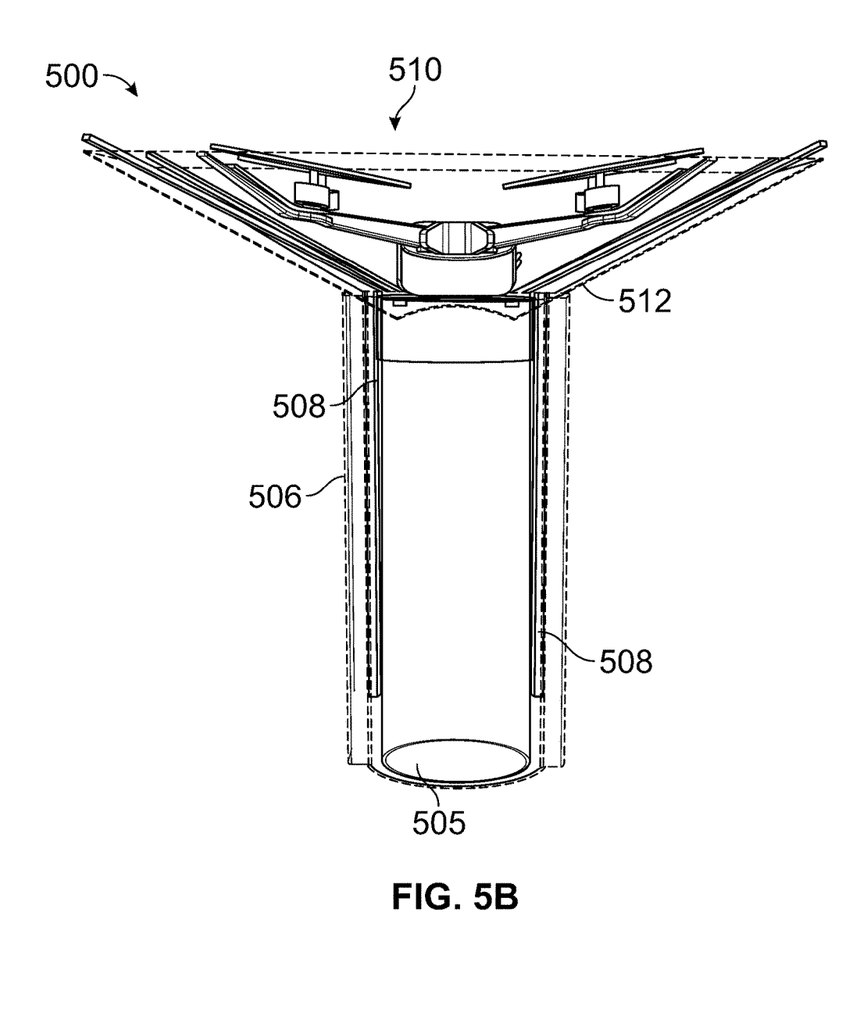

Referring to FIG. 5A and FIG. 5B, a cylindrical housing for storing the UAV and LLU is illustrated in a storage and launch/land state, respectively. As illustrated, the housing 500 includes a cylinder portion 505 for storing the UAV/ LLU 510 in the storage state and a top portion 512 above which the landing funnel extends in the land/launch state to increase the landing area. A landing platform 504 is configured to fit within the housing 500 and includes one or more side portions 506 adapted to engage a threaded lead screw 508, shaft or rod to enable the landing platform to travel up and down the cylinder portion 505.

In one embodiment, the platform is positioned within the cylinder with a linear actuator that moves the platform vertically in the cylinder. This has the effect of moving the platform higher up from the ground level when in use. In some embodiments, a pack of several cylinders placed tightly together without obstructing each other are provided to allow for storage and launching of multiple UAVs. When in the launch/land state, the active platform is raised above the others and may be as wide as desired. On a vehicle with limited real estate, this can be very valuable. The cylinders may be attached to the sides of a vehicle or slotted into it, so that they do not raise the vehicles profile when in storage state. The platform is only present in the moment of launch or landing and otherwise safely stored. The UAV may be pulled downward by a gripping mechanism in the raising platform. This could be a separate mechanism, or a latching element at the end of the actuator and/or platform.

Figure 6A:
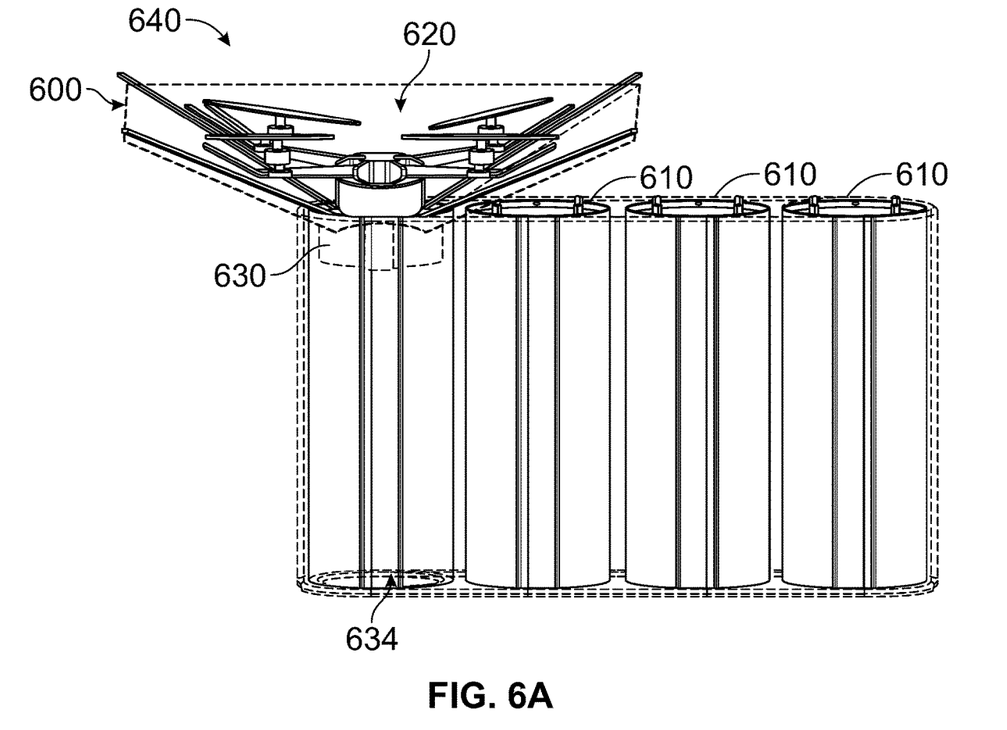
FIGS. 6A-B illustrate an example vehicle launch system, in accordance with embodiments of the present disclosure.
Figure 6B:
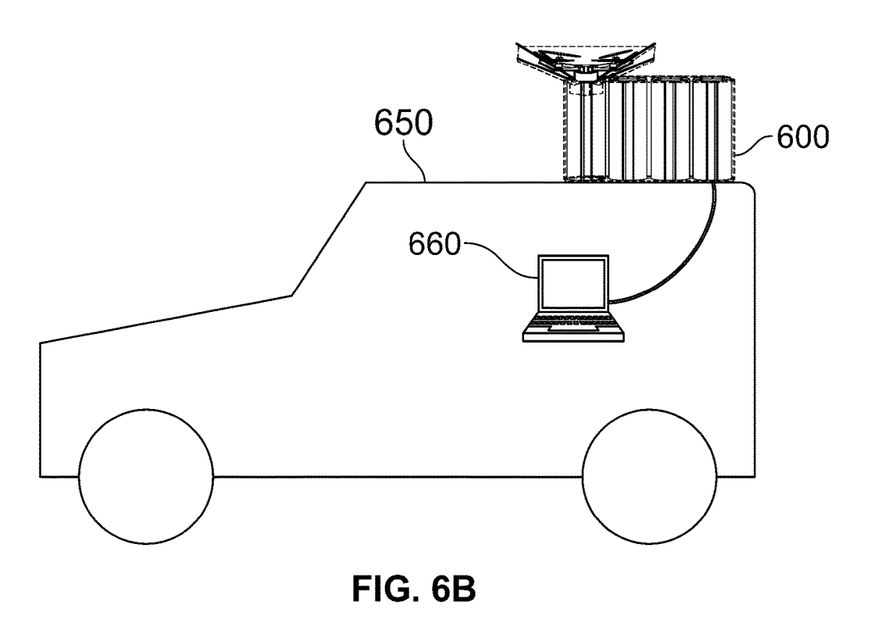

Various embodiments of a vehicle launch system will now be described with reference to FIGS. 6A and 6B. The vehicle launch system comprises a launch box 600 (also referred to herein as a launch device) and an operator terminal 660. The launch box 600 is adapted to be mounted on an exterior surface of a vehicle 650, such as a ground vehicle, water vehicle or other mobile structure. In various embodiments, the launch box 600 may be mounted to another device or structure and/or be operated as a standalone unit. The operator terminal 660 is a mobile computing device communicably coupled to the launch box 600 and operable from the interior of the vehicle 650 or another protected location. The vehicle launch system allows an operator to control one or more UAVs (such as UAV 620) and launch the UAV 620 from inside the vehicle 650, without requiring the operator to step outside of the vehicle 650 to interact with the UAV 620 or launch box 600.

In the illustrated embodiment, a launch box 600 comprises a plurality of LLUs 610, each adapted to securely store a single UAV 620 in its enclosure. Each UAV 620 is positioned in the LLU in a secure position on the launch/land pad. The LLU 610 is further adapted to move the UAV 620 from a storage position inside the LLU 610 to a launch position by an actuator attached to the launch/landing platform to move the UAV 620 such that it is positioned outside of the LLU housing for launch. In some embodiments, each LLU 610 is adapted to be easily removed and replaced with another LLU 610, which may include another UAV 620.

The launch platform 630 comprises charging points for charging the UAV 620 while it is in the LLU 610. The launch platform 630 may further include a release mechanism to hold the UAV 620 on the launch platform 630 while in the storage position, and release the UAV 620 during launch (e.g., when the UAV 620 is positioned in a launch position). The launch platform 630 may also couple the UAV 620 to an operator terminal 660 for communications through a communications link. In various embodiments, the LLU 610 comprises one or more connectors configured to mate with a corresponding connector of the launch box 600 connecting the LLU 610 to a power supply, such as a power supply of the vehicle 650, the operator terminal 660, an internal battery, or other power source. When the UAV 620 is positioned on the launch platform 630, the UAV 620 may be charged. In various embodiments, there may be additional connections enabling communication between the UAV 620 and the operating terminal 660, including wireless and wired communications links. In some embodiments, the launch box 600 comprises electronics for communicating with and controlling the UAV 620. For example, the release mechanism may be adapted to close (e.g., hold the UAV 620 on the platform) in response to a "close" instruction or command received from the operator terminal 660 through the launch box 600, and open (e.g., release the UAV 620) in response to an "open" instruction or command received from the operator terminal 660 through the launch box 600.

In various embodiments, the launch box 600 is further adapted to protect the UAV 620 from weather conditions. For example, the launch box 600 may comprise one or more components for cooling the inside of the launch box, such as a cooling fan. The launch box 600 may further comprise components, such as heating wires, for heating the interior and/or exterior walls of the launch box 600 to facilitate the removable of snow and ice.

During operation, the UAV 620 is maintained in a storage position, protected from the environment, charged and ready for operation. When the operator provides an instruction from the operator terminal 660, the actuator 634 activates, moving the UAV 620 from the storage position to the launch position. The UAV 620 starts on instruction from the operator terminal 660, and provides enough thrust to climb, the release mechanism on the platform 630 opens and the UAV 620 is launched to investigate the area of interest. In various embodiments, the flight path and control of the UAV 620 may be preprogrammed, programmed by the operator terminal 660 (e.g., while the UAV 620 is engaged with the launch platform 630), or controlled during flight by flight controls on the operator terminal 660. In some embodiments, the UAV 620 ends the flight by landing in the extended landing area 640 and returning to the storage position in the LLU 610. Flight data such as images and video captured during flight may be downloaded from the UAV 620 to the operator terminal 660 through a communications link.

Figure 7:
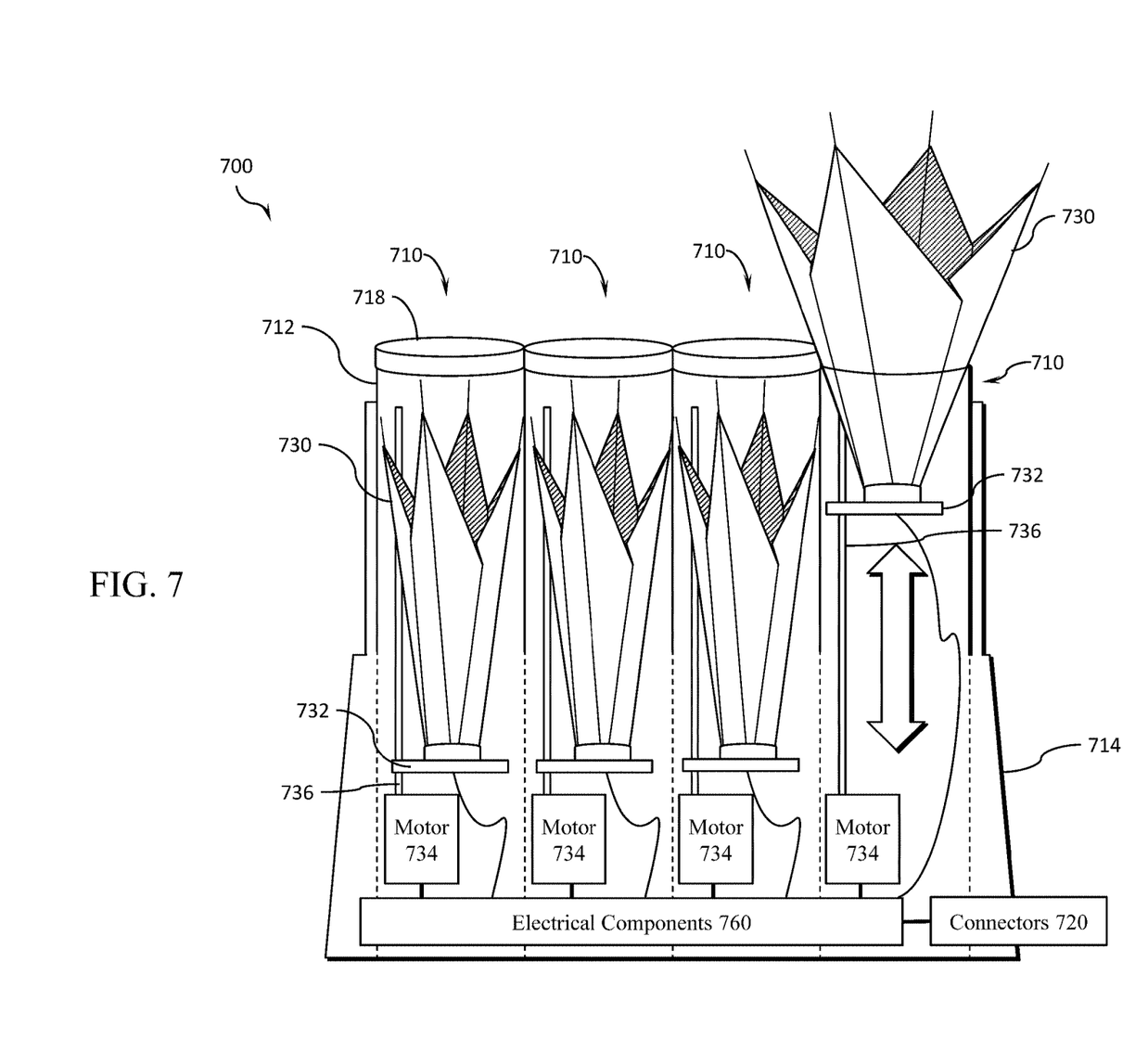
FIG. 7 illustrates example components of a vehicle launch system, in accordance with embodiments of the present disclosure.

Referring to FIG. 7, an embodiment of a vehicle launch box will described. In various embodiments, the launch box 700 may be used in civilian settings, military settings and other environments, and may be adapted to fit vehicles including ground vehicles such as consumer automobiles and military vehicles, such as battle tanks, and water vehicles. In one embodiment, the launch box 700 may be mounted (e.g., bolted at connector points designated in the bottom of launch box) to the outside of a vehicle in a position such that actuation of the LLU and launch of the UAV is unobstructed. In one embodiment, the launch box is adapted to fit one or more UAVs, which may include single rotor, quadcopters, and other types of UAV/drones. Although the illustrated embodiment includes four LLUs 710, other numbers of LLUs may be utilized consistent with the present disclosure. In various embodiments, the LLUs 710 can be inserted and/or removed from one or more launch boxes. The UAVs (not shown) may be loaded or removed from one or more LLUs before or after insertion of the LLU into a launch box. Power to the launch box 700 may be supplied by the vehicle power supply, by an internal battery unit or through another available power source.

The launch box 700 may be remotely controlled by the operator positioned in the vehicle, which may facilitate wired communications between an operator terminal and the launch box 700. An antenna positioned at the back of the box may be provided for wireless transmission to/from the operating UAV and/or operator terminal. Connectors 720 disposed on the back of the launch box connect the electrical components 760 of the launch box 700 to the operator control unit, a power supply, environmental sensors and other communications links.

Each LLU 710 comprises a housing 712 having an exterior adapted to fit securely in a cavity (or recess) of a launch box structure 714, and an interior adapted to house the UAV, launch/land platform 732, extended platform elements 730 (e.g., articulating arms and flexible fabric in a folded position as illustrated), and components that enable movement of the UAV between the storage position and launch position as described herein. In the storage position, the lid 718 is closed, and the UAV is held on the launch/land platform 732. In some embodiments, the launch/land platform 732 is a structure adapted to securely hold the UAV, and includes a release mechanism including release arms adapted to hold the UAV when engaged, and release the UAV when the release arms are opened (e.g., using a solenoid, micro actuator, or mechanical release assembly). The launch/land platform 732 is coupled to an actuator assembly that includes a motor 734 and a lead screw 736. In the illustrated embodiment, the actuator assembly comprises a lead screw step motor (e.g., servo motor 734) which is mounted to the housing 712 at a first end. The rotation of the lead screw 736 causes the launch/land platform 732 to traverse the lead screw 736 when activated via the connectors 720 causing the lid 718 to open and the UAV to move into a launch position. As illustrated, the lead screw step motor (DC) causes the screw 736 to open the lid 718 and position the launch/land platform 732, including the extended platform elements 730 for launch.

While in the storage position, the UAV is charged by a power supply coupled to the UAV through the launch/land platform 732 and the connectors 720. In one embodiment, the bottom of the funnell structure includes charging contacts to engage with corresponding charging contacts on the UAV. In other embodiments, the launch platform may include an inductive charging pad, a connector or other mechanisms to facilitating charging of the UAV. In the launch position the UAV may continue to be charged and is also available for operator control, including instructions to launch the UAV. The actuator assembly (e.g., motor 734 and lead screw 736), when operated, opens and/or closes the lid 718 and positions the launch/land platform 732 in the launch position. The actuator assembly may be calibrated/tested to get correct distances between various states. In various embodiments, the launch box 700 may include one or more weather proofing components, such as heating wires and/or a cooling fan.

In various embodiments, the operator may instruct the UAV to launch and engage in a flight mission under operator control through the operator terminal or through a preprogrammed flight scenario. The UAV may return to the launch box 700 and land on the extended landing platform. The release arms may close when the UAV is in landing platform securely holding the UAV in place. The motor 734 may then be instructed to lower the platform 732, which causes the lid 718 to close, and the launch/land platform 732 to move into the storage position until the next flight. While stored in the LLU 710, the UAV can recharge. In some embodiments, UAV may communicate with the launch box 700 and/or operator terminal to download flight information, including acquired images, through the connector 720.

Figure 8:
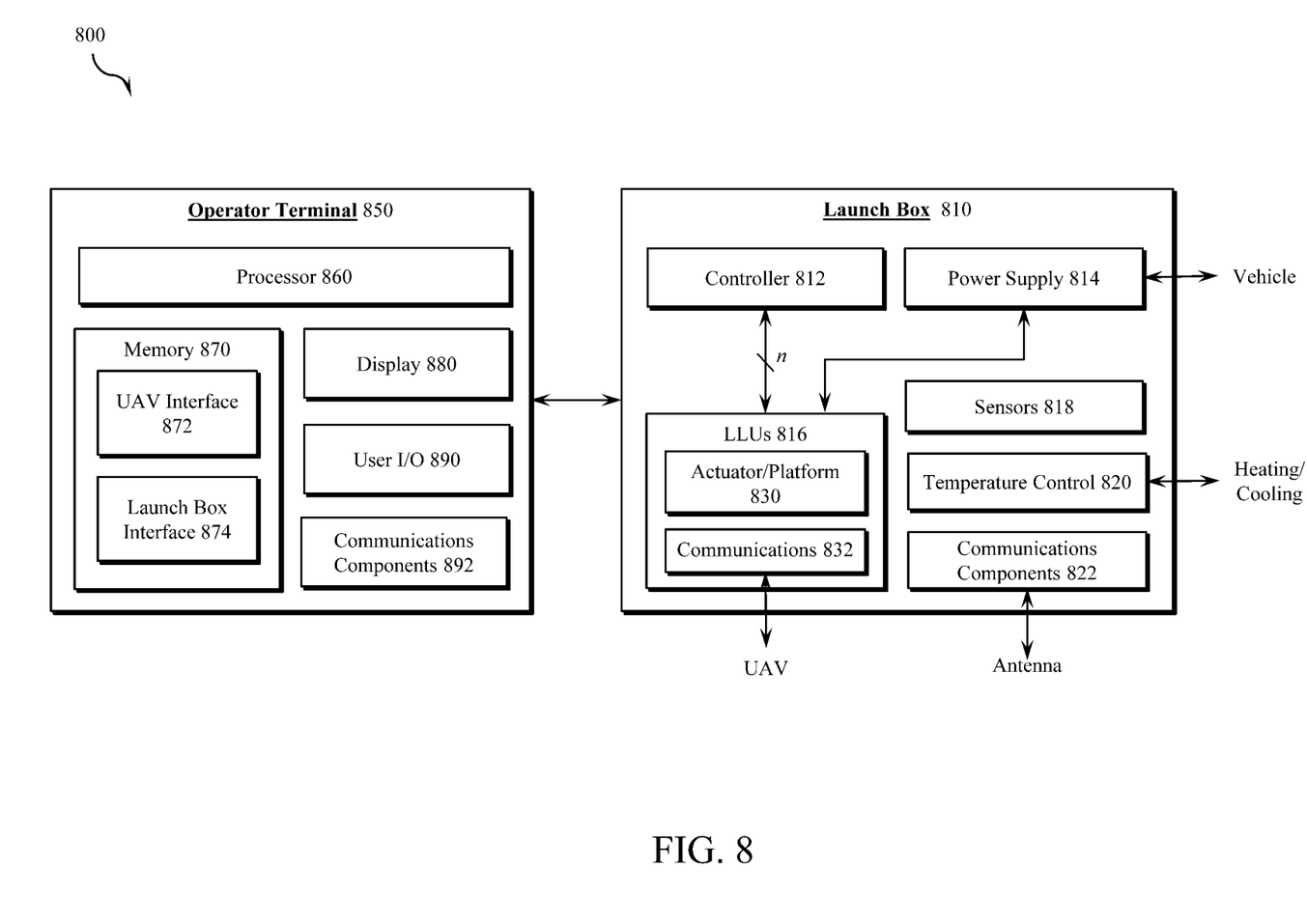
FIG. 8 illustrates electrical and processing components for a vehicle launch system, in accordance with embodiments of the present disclosure.

FIG. 8 illustrates electrical and processing components for a vehicle launch system in accordance with various embodiments of the present disclosure. A system 800 includes launch box electrical components 810 and an operator terminal 850. The launch box electrical components 810 facilitate the operation of the launch box, including storing, charging, releasing, launching and communicating with UAVs in the LLUs. In various embodiments, the launch box electrical components 810 includes a controller 812, power supply 814, LLUs 816 having electrical components coupled with the launch box electrical components 810, communications components 822, optional sensors 818 and optional temperature controls 820.

The controller 812 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of the launch box. Power supply 814 may be implemented, for example, as one or more batteries and/or power connections to permit use of the launch box and charging of UAVs coupled thereto. In some embodiments, the power supply 814 is coupled to a vehicle power supply, which provides electrical power to the launch box.

Communications components may include wired and wireless interfaces. Wired interfaces may include communications links with the operator terminal 850 and the vehicle, and may be implemented as one or more physical network or device connect interfaces. Wireless interfaces may be implemented as one or more WiFi, Bluetooth, cellular, infrared, radio, and/or other types of network interfaces for wireless communications, and may facilitate communications with the operator terminal, vehicle, UAVs and other wireless device. In some embodiments, the communications components 822 include an antenna for communications with a UAV during flights.

In various embodiments, the controller 812 is operable to provide control signals to each of a plurality of LLUs 816 of the launch box (e.g., through a connector interface coupling the LLU electrical components to the launch box electrical components 810). In various embodiments, the controller 812 provides control signals to a LLU 816 to provide actuator/platform 830 control (e.g., to move to a storage position or launch position; to close or open release arms). LLU communications components 832 provide communications between the controller 812 and connected UAV. In various embodiments, the controller 812 facilitates communications between the operator terminal 850 and UAVs stored in the LLUs. The launch box electrical components 810 may also include optional temperature controls 820 for controlling heating and cooling components if implemented in the launch box. Optional sensors 818 may be provided for additional environmental feedback.

The operator terminal 850 is operable to communicate with and control the operation of the launch box. The operator terminal 850 includes a processor 860, a memory 870, a display 880, user input/output components 890 and communications components 892. The processor 860 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operator terminal. In this regard, processor 860 may execute machine readable instructions (e.g., software, firmware, or other instructions) stored in memory 870.

Memory 870 may be implemented as a machine readable medium storing various machine readable instructions and data. For example, in some embodiments, memory 870 may store an operating system and one or more applications as machine readable instructions that may be read and executed by processor 860 to perform various operations described herein. In some embodiments, memory 870 may be implemented as non-volatile memory (e.g., flash memory, hard drive, solid state drive, or other non-transitory machine readable mediums), volatile memory, or combinations thereof.

The memory 870 includes a UAV interface 872 and a launch box interface 874. The launch box interface 874 includes status, configuration and control features which may include all control features disclosed herein. For example, the launch box interface 874 may include identification of LLUs and UAVs coupled to the launch box, storage/launch status and control, UAV charging status and flight planning, control and information. The UAV interface 872 facilitates communications with the UAV before, during and after flight and may include flight controls for controlling the UAV during flight, and an interface for downloading and storing images and other data obtained by the UAV during flight.

Communications components 892 may include wired and wireless interfaces. A wired interface may be implemented as one or more physical network or device connection interfaces (e.g., Ethernet, and/or other protocols) configured to connect the operator terminal 850 with the launch box electrical components 810. Wireless interfaces may be implemented as one or more WiFi, Bluetooth, cellular, infrared, radio, and/or other types of network interfaces for wireless communications. In some embodiments, the operator terminal 850 includes wireless interfaces for communicating with the launch box and for direct communications with one or more UAVs.

Display 880 presents information to the user of operator terminal 850. In various embodiments, display 880 may be implemented as a liquid crystal display (LCD), an organic light emitting diode (OLED) display, and/or any other appropriate display. User input/output components 890 receive user input to operate features of the operator terminal 850, and may include flight controls for one or more UAVs.

Figure 9:
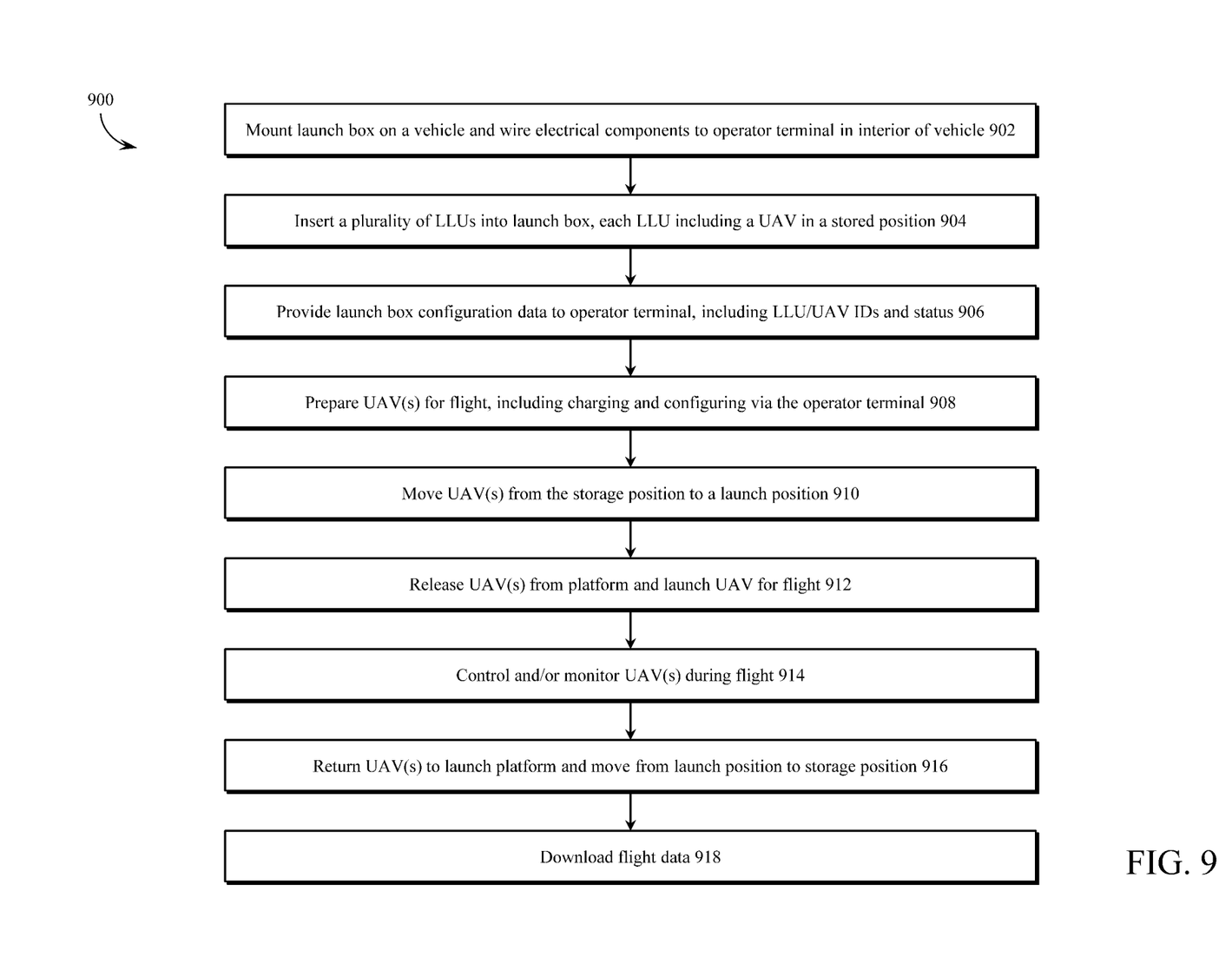
FIG. 9 illustrates a method for using a vehicle launch device, in accordance with one or more embodiments.

Referring to FIG. 9, a method 900 for using a vehicle launch device will now be described in accordance with one or more embodiments. In step 902, a launch box is mounted on an exterior surface of a vehicle, such as the roof of a military vehicle. In some embodiments, the launch box is wired to receive power from the vehicle power supply and for communications with an operator terminal located on the interior of the vehicle. In step 904, a plurality of LLUs are inserted into the launch box. Each LLU may include a UAV in a stored position. In some embodiments, the launch box may be adapted to hold 4-6 LLUs. When the LLUs are inserted, the UAV is electrically coupled to the launch box and the launch box may provide associated configuration data to the operator terminal in step 906. The configuration data may include an identification of the LLUs and UAVs loaded into the launch box and a current status of the UAVs such as percentage charged and current flight plan. In step 908, the operator terminal is used to prepare one or more UAVs for flight, including charging the UAV and configuring the UAV for its next mission.

In step 910, the operator terminal (which is located on the interior of the vehicle) transmits instructions to the launch box to prepare one or more UAVs for launch, and the launch box instructs the launch mechanisms of the corresponding LLUs to move from the storage position to a launch position. In step 912, one or more UAV(s) are released from the platform and launched for flight as instructed by the operator terminal. During flight, the operator may control and/or monitor the UAV(s) using the operator terminal in step 914. In step 916, each UAV returns to the platform and the launch box returns the UAV to the storage position for protection, charging and communication with the operator terminal. In step 918, the UAV may download flight data and other acquired information to the operator terminal.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a plurality of launch/land units (LLU), each LLU comprising:
      a housing having a top portion with an opening formed therein;
      a launch/land platform adapted to hold an aerial vehicle; and
      an extended landing platform coupled to the launch/land platform;
   wherein the launch/land platform is configured to move between a storage position where the launch/land platform is positioned inside the housing, and a launch position where the launch/land platform is positioned at the top portion of the housing enabling the aerial vehicle to launch and/or land on the launch/land platform; and
   wherein the extended landing platform fits inside the opening of the housing when the launch/land platform is in the storage position and wherein the extended landing platform extends beyond the launch/land platform when the launch/land platform is in the launch position; and a launch box comprising a launch box housing having a plurality of recesses, each recess adapted to receive one of the plurality of LLUs.

2. The system of claim 1, wherein the LLU further comprises a release mechanism attached to the launch/land platform and configured to hold the aerial vehicle on the launch/land platform when the launch/land platform is in the storage position and release the aerial vehicle when the launch/land platform is in the launch position; and wherein the housing further comprises communications components operable to facilitate communications with an operator terminal, and wherein the release mechanism is adapted to release the aerial vehicle in response to an instruction received from the operator terminal, and wherein the launch/land platform further comprises connectors for communicably coupling the aerial vehicle with the operator terminal.

3. The system of claim 1, wherein the LLU further comprises a cover coupled to the housing by a hinge and adapted to cover the opening of the housing when the launch/land platform is in the storage position; wherein the extended landing platform forces the cover open during a transition from the storage position to the launch position; and wherein the launch/land platform has charging points coupled to a power supply and is operable to charge the aerial vehicle when engaged with the launch/land platform.

4. The system of claim 1, wherein the extended landing platform comprises:
a plurality of articulating arms, each arm attached to a perimeter of the launch/land platform by a hinge; and
a flexible platform connected to each of the articulating arms, the flexible platform extending a landing surface of the launch/land platform when in the launch position.

5. The system of claim 1, wherein the housing comprises weather proofing components comprising heating wires and/or a cooling fan.

6. The system of claim 1, wherein the LLU is further configured to
receive a first aerial vehicle on the launch/land platform of the LLU; and
move the first aerial vehicle between the storage position inside of the housing and the launch position outside of the housing along a first path that passes through the opening of the LLU.

7. The system of claim 6, wherein the launch box is configured for mounting to an exterior surface of a ground vehicle and receiving an instruction from an operator terminal positioned inside the ground vehicle and communicably coupled to the launch box; and
wherein each LLU, when inserted into one of the recesses, is further configured to move the aerial vehicle from the storage position to the launch position and launch the first aerial vehicle in response to the instruction received from the operator terminal.

8. The system of claim 7 further comprising:
a second LLU configured for insertion into a second one of the recesses of the launch box;
wherein the second LLU is configured to receive a second aerial vehicle on a second launch/land platform of the second LLU; and
wherein the LLU, when inserted into the second one of the recesses, is further configured to move the second aerial vehicle between a second storage position inside the second LLU and a second launch position along a path that passes through an opening of the second LLU and selectively launch one of the first aerial vehicle and the second aerial vehicle.

9. The system of claim 1,
wherein the launch box is further adapted to be mounted on an exterior surface of a ground vehicle, the launch box receiving the LLU and operable to move a first aerial vehicle positioned therein between the storage position inside the launch box and the launch position outside the launch box; and
an operator terminal communicably coupled to the launch box and operable to control a launch mechanism.

10. The system of claim 9, wherein the operator terminal comprises aerial vehicle flight controls and/or camera controls; and wherein the operator terminal is operable from an interior of the ground vehicle to transmit an instruction to the launch device to instruct the launch mechanism to move into the launch position.

11. The system of claim 9 wherein, in the storage position, the aerial vehicle is protected from environmental conditions and coupled to a power supply to facilitate charging; and wherein the launch mechanism comprises an actuator adapted to move the aerial vehicle from the storage position to the launch position.

12. The system of claim 9 wherein the launch box further comprises a plurality of LLUs, each of the plurality of LLUs being independently operable to move a corresponding one of a plurality of aerial vehicles between the storage position inside the LLU and the launch position outside the LLU.

13. The system of claim 12 wherein each of the plurality of LLUs further comprises a connector adapted to mate with a corresponding launch box connector to provide power and communications between the launch box and each of the plurality of aerial vehicles; and wherein the launch box further comprises electronics including control components operable to control operation of each of the plurality of LLUs inserted into the launch box.

14. The system of claim 12 wherein each of the plurality of LLUs further comprises a launch/land platform adapted to hold one of the plurality of aerial vehicles, the launch/land platform operable to charge a launch/land platform aerial vehicle; wherein an actuator assembly is operable to move the launch/land platform through the opening to open the cover of the housing; wherein the launch mechanism comprises a lead screw step motor coupled to a corresponding LLU at a second hinge point, and a screw axel mounted to the corresponding LLU at a first end.

15. The system of claim 12, further comprising a release mechanism operable to hold the aerial vehicles in a closed position and release the aerial vehicles for launch in an open position; and a solenoid operable to selectively open and close the release mechanism.

16. The system of claim 1, wherein the system is further configured to
store the aerial vehicle on the launch/land platform in the storage position in an enclosure of the housing, the wherein the extending landing surface is folded when positioned in the storage position; and
activate a motor to move the launch/land platform into the launch position, wherein the aerial vehicle is positioned outside of the housing and wherein the extending landing surface is unfolded to extend beyond the permitter of the launch/land platform.

17. The system of claim 16 wherein the system is further configured to mount to an exterior surface of a vehicle and receive an instruction from an operator terminal positioned inside the vehicle to move the aerial vehicle from the storage position to the launch position.

18. The system of claim 16 wherein the store the aerial vehicle on the launch/land platform in the storage position comprises positioning the aerial vehicle on the launch/land platform;
   wherein the launch/land platform includes a plurality of articulating arms that are folded when in the storage position; and
   wherein the plurality of articulating arms extend when the aerial vehicle is moved into the launch position.

19. The system of claim 18 wherein the system is further configured to store the aerial vehicle on the launch/land platform in the storage position in the enclosure of the housing by:
   receiving the aerial vehicle on the launch/land platform and/or extended landing platform;
   activating release arms on the launch/land platform to hold the aerial vehicle on the launch/land platform;
   lowering the launch/land platform into the housing; and
   folding the articulating arms via contact with the housing as the launch/land platform is lowered, forcing the release arms to bend at a hinge point allowing the launch/land platform with the aerial vehicle and extended landing platform to fit within the housing.

* * * * *

UNITED STATES PATENT AND TRADEMARK OFFICE
CERTIFICATE OF CORRECTION

| | |
|---|---|
| PATENT NO. | : 11,767,110 B2 |
| APPLICATION NO. | : 17/121718 |
| DATED | : September 26, 2023 |
| INVENTOR(S) | : Erik Falk-Petersen |

It is certified that error appears in the above-identified patent and that said Letters Patent is hereby corrected as shown below:

In the Claims

Claim 16, Column 12, Lines 55-56, change "of the housing, the wherein the extending landing surface" to --of the housing, wherein the extending landing surface--.

Claim 16, Column 12, Lines 61-62, change "extend beyond the permitter of the launch/land platform." to --extend beyond the perimeter of the launch/land platform.--.

Signed and Sealed this
Seventh Day of November, 2023

Katherine Kelly Vidal
*Director of the United States Patent and Trademark Office*